C. Burnham,
Flour Sieve.

Nº 50,447.     Patented Oct. 17, 1865.

Witnesses:
B. J. Campbell
Edw Schafer

Inventor:
Charles Burnham
by his Atty's
Mason, Fenwick & Lawrence

UNITED STATES PATENT OFFICE.

CHARLES BURNHAM, OF PHILADELPHIA, PENNSYLVANIA.

FLOUR-SIFTER.

Specification forming part of Letters Patent No. 50,447, dated October 17, 1865.

*To all whom it may concern:*

Be it known that I, CHARLES BURNHAM, of the city and county of Philadelphia, State of Pennsylvania, have invented a new and Improved Flour-Sifter; and I do hereby declare that the following is a full, clear, and exact description thereof, reference being had to the accompanying drawings, making a part of this specification, in which—

Figure 1:
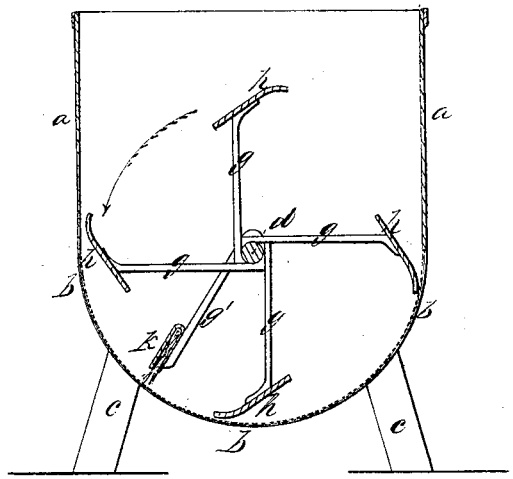
Figure 2:
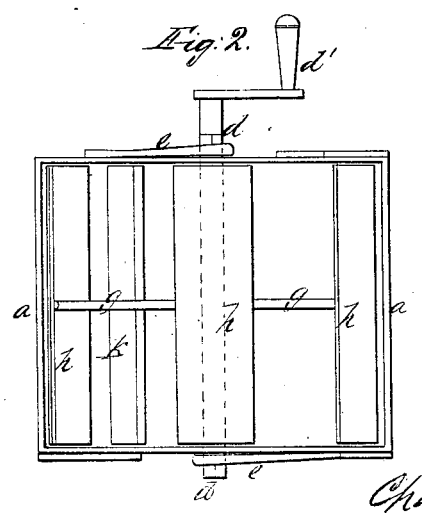

Figure 1 is a transverse section through the improved sifter, taken in a vertical plane. Fig. 2 is a top view of the sifter complete.

Similar letters of reference indicate corresponding parts in both figures.

Flour-sifters have been constructed before my invention with radial plates arranged upon arms projecting from a rotating shaft in such manner that the edges of the plates would stir the flour when they revolved within a box having a semi-cylindrical sieve-bottom. Such plates or wings operate very well to stir the flour and allow the fine particles to pass through the sieve; but they neither compel the flour to pass through the sieve, nor do they break up the lumps of flour. To remedy the objection to radial plates, brushes, india-rubber wings, and other contrivances have been used; but all are liable to some objection.

The objection is remedied by my invention, which has for its object the construction and arrangement of plates or wings upon radial arms projecting from a turning shaft in such manner that the wings will serve the double purpose of stirring the flour and compelling its discharge through the sieve, and also of crushing the lumps of flour and causing every particle of good flour to pass through the sieve.

Another object of my invention is to employ a revolving brush which will act upon the sieve and assist in compelling the discharge of the fine flour, in conjunction with stirring-blades, which are so constructed that they serve as crushers and stirrers, for the purpose of facilitating the discharge of the flour, as will be hereinafter described.

To enable others skilled in the art to understand my invention, I will describe its construction and operation.

In the accompanying drawings, *a* represents a rectangular box, having a semi-cylindrical sieve-bottom, *b*, and mounted upon legs *c c*, which elevate the bottom above the surface upon which the machine is supported. A shaft, *d*, passes longitudinally through the ends of the box *a* through oblong holes, which will admit of the shaft rising and falling, resisted only by springs *e e*, which bear down upon square or flat faces formed on said shaft. One end of this shaft *d* has a hand-crank, *d'*, applied to it, by means of which it is rotated.

Four radial arms, *g g*, project from the shaft *d* inside of the box *a*, and have plates or blades *h h* secured on their ends in lines parallel to the shaft, as shown in Fig. 2. These blades are arranged in planes which are tangential to a circle touching their inner edges and described from the axis of the shaft *a*, as shown in Fig. 1, and their outer edges are curved inward, so that the outer surfaces of these blades will all touch, or nearly touch, the surface of the sieve as they are revolved in the direction indicated by the arrow in Fig. 1. These blades *h h* are thus made to present a flat and a curved surface to the flour, and by their tangential arrangement they serve to gather and crush the lumps of flour, and at the same time to compel its discharge through the sieve-bottom *b*.

It will be seen by reference to Fig. 1 that the blades *h h*, when brought close to the sieve *b*, will form receptacles, from which the lumps of flour cannot escape without being crushed against the inside surface of the sieve-bottom.

In damp weather, when flour is always more or less moist and difficult to sift through fine meshes, it will clog up the meshes and render the operation of sifting very slow. To obviate this clogging, the shaft *d* is turned in an opposite direction to that above mentioned, when the edges of the blades *h h* nearest the sieve will operate as scrapers to clear the meshes.

To effectually prevent the sieve from clogging, I employ a brush, *k*, which is made of stiff bristles and secured to a radial arm, *g'*, projecting from the shaft *d*. This brush is made to touch or press against the sieve as the shaft *d* revolves, and to compel the flour to pass rapidly through the sieve and to keep the meshes clear. This brush *k* will serve to counteract the tendency of the tangential blades *h h* to clog up the meshes when the flour is damp. The upward-yielding action of the shaft *d* will prevent the blades *h h* from packing the flour against the sieve *b*; and the springs *e e*, acting upon the flat surface of the shaft $d$, will agitate this shaft and its blades and greatly assist in discharging the flour through the sieve and preventing it from packing.

Having described my invention, what I claim as new, and desire to secure by Letters Patent, is—

1. Arranging within a box having a semi-cylindrical sieve-bottom a series of revolving tangential plates, $h\ h$, a portion of the surface of each one of which is curved, substantially as described.

2. The combination of a brush, $k$, with revolving plates $h\ h$, which are so applied to radial arms that they serve as crushers and also stirrers, substantially as described.

3. The combination of the revolving and stirring plates $h\ h$ and a brush, $k$, applied to a shaft, $d$, which is allowed to have an upward-yielding movement during the operation of sifting, substantially as described.

CHAS. BURNHAM.

Witnesses:
HORACE M. TUBBS,
JOSEPH G. TAITE.